United States Patent Office 3,291,769
Patented Dec. 13, 1966

3,291,769
MANUFACTURE OF POLYVINYLIDENE CHLORIDE COPOLYMER EMULSIONS
David Malcolm Woodford, Bozeat, and Graham Brown, Wellingborough, England, assignors to Scott Bader & Co. Ltd., Wollaston, Wellingborough, Northamptonshire, England, a company of Great Britain and Northern Ireland
No Drawing. Filed Oct. 28, 1963, Ser. No. 319,523
Claims priority, application Great Britain, Oct. 30, 1962, 40,997/62
8 Claims. (Cl. 260—29.6)

The present invention relates to a method for the production of an aqueous polyvinylidene copolyder emulsion.

It is known that aqueous polyvinylidene chloride copolymer emulsions have many properties which make them attractive coatings for paper and films when barrier properties are required. In order to get the best barrier properties the vinylidene chloride content of the polymer should be as high as possible. In general vinylidene chloride monomer should represent at least 80% by weight, preferably 88% to 93% by weight of the total monomer (including comonomer) content from which the copolymer is derived.

Copolymer emulsions derived from such high proportions of vinylidene chloride monomer are liable to develop crystallinity either during manufacture or on ageing. Such crystalline emulsions are not suitable for coating and may even coagulate.

Crystallinity in this sense is measured by examination of air dried films by infra-red spectroscopy. Film forming emulsions may be cast onto glass from which the dried film is mounted and non-film forming emulsions are cast onto silver chloride sheet, which is used as a supporting substrate. A suitable spectroscope is the Perkin Elmer, Model B7, and this instrument can be used set at a scan speed of 12 minutes. It is essential that the films are kept cool and for this reason they are cast at 20° C., and examined as soon as they are dry. In addition, the scan is started at a wave length of 12.5 microns to ensure that the heating effect of the infra-red beam is kept to a minimum. Crystalline polymers are characterised by the formation of a peak at a wave length of 13.37 microns.

Many vinylidene chloride emulsions will spontaneously coagulate on storage if crystallinity develops. Various methods have been claimed for delaying or preventing either the coagulation or crystallinity formation, but these methods have been found not to be entirely satisfactory for commercial routine production.

The method of manufacture most frequently described in the literature is a "bulk" method, such as the following example.

*Example 1 (prior procedure)*

An aqueous emulsion was prepared according to the following formulation, in which all parts are expressed in grams.

|     |     | Parts |
| --- | --- | ---:|
| (1) | Water | 404.75 |
| (2) | "Antarox CO850" | 1.00 |
| (3) | Ammonium persulphate | 0.50 |
| (4) | Acetic acid | 0.25 |
| (5) | Vinylidene chloride | 468.00 |
| (6) | Ethyl acrylate | 34.60 |
| (7) | Methyl methacrylate | 17.40 |
| (8) | Sodium metabisulphite | 0.16 |
| (9) | "Antarox CO850" | 11.00 |
| (10) | 25% active "Satinol" | 12.00 |
| (11) | Sodium metabisulphite | 0.34 |
| (12) | Water | 50.00 |
|     |     | 1,000.00 |

"Antarox CO850" is nonylphenoxy poly (ethyleneoxy) ethanol made by the General Aniline and Film Corporation.

"Satinol" is a technical grade of the sodium salt of sulphated lauryl alcohol made by Laporte Chemicals Ltd.

Item (1) was charged into a 2-litre round bottomed flask fitted with a reflux condenser and a half moon shaped stirrer. Items (2), (3) and (4) were added and dissolved, and the apparatus purged with nitrogen. The monomers, items (5), (6) and (7) were added, the temperature adjusted to 35° C. and item (8), dissolved in a little water, was added to initiate the reaction. A slow addition of items (9), (10) and (11) dissolved in (12) was commenced and continued over a period of 2½ hours. By this time the reflux had ceased, indicating that the reaction was complete. The emulsion was then taken to 40° C. and left there for 1 hour before cooling.

Films cast from this emulsion immediately after manufacture were substantially amorphous. After ageing the emulsion for two days, however, films cast from it were found to be crystalline.

An improvement on the "bulk" method can be made by using a "delayed addition" technique, as in the following example, in which all parts are expressed in grams.

*Example 2 (prior procedure)*

|     |     | Parts |
| --- | --- | ---:|
| (1) | Water | 385.75 |
| (2) | Acetic acid | 0.25 |
| (3) | Antarox CO850 | 0.50 |
| (4) | Vinylidene chloride | 468.00 |
| (5) | Ethyl acrylate | 34.60 |
| (6) | Methyl methacrylate | 17.40 |
| (7) | 5% by weight aqueous ammonium persulphate | 10.00 |
| (8) | 5% by weight aqueous sodium metabisulphite | 10.00 |
| (9) | Antarox CO850 | 11.50 |
| (10) | 25% active Satinol | 12.00 |
| (11) | Water | 50.00 |
|     |     | 1,000.00 |

The apparatus used was identical to that used in Example 1. Items (1), (2) and (3) were charged into the flask, mixed and purged with nitrogen and one tenth of a mixture of the monomers, items (4), (5) and (6) were added. The temperature was adjusted to 35° C. and one third of items (7) and (8) were added to initiate the reaction. The temperature was maintained at 35° C. and as soon as the reflux ceased, indicating that initial addition of monomer had polymerised, the remaining monomers were fed into the flask over a period of three hours. At the same time, the rest of item (7) and a mixture of the rest of item (8) and items (9) and (10), dissolved in (11), were added from separate openings and at equivalent rates to the monomers. When the monomer addition was complete, the reflux quickly ceased. The batch temperature was raised to 40° C. and left at this for one hour to react any traces of monomer that remained. A free flowing emulsion of fine particle size containing little coagulate was obtained.

Films cast from this emulsion immediately after manufacture and after two days' ageing were found to be amorphous, but after seven days' ageing approximately one batch in ten was found to yield crystalline films.

The methods illustrated in Examples 1 and 2 are therefore unsatisfactory for commercial production of aqueous polyvinylidene chloride copolymer emulsions.

It is a primary object of this invention to overcome or minimise the disadvantages inherent in the above-mentioned prior procedures.

According to the present invention we provide a method for the production of an aqueous polyvinylidene copolymer emusion which comprises feeding separate flows of a vinylidene chloride monomer component and a comonomer component into a reaction chamber containing water, there being present during the copolymerisation reaction at least a polymerisation catalyst and a surfactant, wherein the quantity of the vinylidene chloride monomer component required for the copolymerisation reaction is introduced into the reaction chamber at such a rate that the addition of the total vinylidene chloride monomer component required is completed before the addition of the total comonomer component required for the copolymerisation reaction is completed, the comonomer component being added continuously during the copolymerisation reaction.

The comonomer component may comprise an acrylate or methacrylate or a mixture thereof, for example a mixture of methyl methacrylate and ethyl arcrylate, or it may comprise acrylonitrile or a mixture of acrylonitrile with an acrylate or methacrylate. Other comonomers may be used if desired, for instance styrene, vinyl chloride, vinyl acetate, acrylamide, vinyl crotonate etc.

In a preferred method embodying this invention between one twentieth and one third by weight of the total comonomer component required is added to the reaction chamber after the addition of the total vinylidene chloride monomer component required has been completed.

It is generally desirable in order to obtain consistent and reproducible results to effect the copolymerisation reaction under carefully controlled temperature conditions.

Many surfactants may be used but we find that a surfactant comprising a mixture of non-ionic and anionic substances gives good results.

It may be convenient to introduce the comonomer component into the reaction chamber in two separate flows. For instance, in one preferred procedure, with one of the said separate flows a major proportion of the comonomer component is introduced into the reaction chamber concurrently with the flow of the vinylidene chloride monomer component, the residual amount of the comonomer component to be introduced into the reaction chamber then being introduced with the other of the said separate flows.

The following examples illustrate preferred methods embodying this invention.

*Example 3*

The apparatus and formulation used were exactly as for Example 2. The general method was also identical with the exception that 5% of the total weight of the ethyl acrylate and methyl methacrylate required was withheld from the admixture with vinylidene chloride. This 5% of withheld comonomer component was run into the flask, over a period of ten minutes, immediately the main addition had been completed. It was observed that the reflux ceased almost immediately after the completion of the main addition, indicating that the low boiling vinylidene chloride (B.P. 31.9° C.) was substantially polymerised. The rest of the process was exactly as used in Example 2. The product produced was identical in viscosity, appearance and particle size to that produced in Example 2.

Films cast from this emulsion were found to be amorphous, even after ageing the emulsion for three months.

*Example 4*

The formulation used was exactly as for Example 3. The apparatus, however, was of a suitable construction to allow the method to be conducted under pressure. The general method was also identical except that 7% of the total weight of the ethyl acrylate and methyl methacrylate was withheld from the admixture with vinylidene chloride. The temperature was adjusted to 38° C. and the reaction controlled by not allowing the internal pressure to rise above 5 lb./sq. in. The 7% of withheld monomer component was run into the reaction vessel immediately the main addition had been completed. It was observed that the pressure decreased rapidly almost immediately after the completion of the main addition, indicating that the vinylidene chloride was substantially polymerised.

The rest of the process was exactly as used in Example 3. The product produced was identical in viscosity, appearance and particle size to that produced in Example 3.

Films cast from this emulsion were found to be amorphous, even after ageing the emulsion for three months.

*Example 5*

The apparatus and formulation used were exactly as for Example 2 except that instead of items (5) and (6) a quantity of acrylonitrile equal to the combined weights of both these items was used and the amount of both items (7) and (8) was increased to 25 grams.

The method used was similar to that of Example 3, i.e. 5% of the total weight of the acrylonitrile was withheld from the admixture with vinylidene chloride and run into the flask immediately the main addition had been completed. A similar emulsion to that produced in Example 3 was obtained. It was observed that the reflux ceased almost immediately after the completion of the main addition, indicating that the low boiling vinylidene chloride (B.P. 31.9° C.) was substantially polymerised. The rest of the process was exactly as used in Example 2. The product produced was identical in viscosity, appearance and particle size to that produced in Example 2.

Films cast from this aqueous emulsion were found to be amorphous, even after ageing the emulsion for three months, and were shown to exhibit better solvent and grease resistance properties to those obtained from the other examples.

What we claim and desire to secure by Letters Patent is:

1. A method for the production of an aqueous stable amorphous polyvinylidene emulsion which comprises feeding separate flows of a vinylidene chloride monomer component and a comonomer component into a reaction chamber containing water, there being present during the copolymerisation reaction at least a polymerisation catalyst and a surfactant, wherein the quantity of the vinylidene chloride monomer component required for the copolymerisation reaction is introduced into the reaction chamber at such a rate that the addition of the total vinylidene chloride monomer component required is completed before completion of the addition of the total comonomer component required for the copolymersiation whereby between about one twentieth and about one third by weight of the total comonomer component required is added to the reaction chamber after the addition of the total vinylidene chloride monomer component required has been completed, the comonomer component being added continuously during the copolymerisation reaction.

2. Method according to claim 1, wherein the comonomer component comprises an acrylate or methacrylate or a mixture thereof.

3. Method according to claim 1, wherein the comonomer component comprises a mixture of methyl methacrylate and ethyl acrylate.

4. Method according to claim 1, wherein the comonomer component is chosen from the group consisting of acrylonitrile and a mixture of acrylonitrile with a member chosen from the group consisting of an acrylate and a methacrylate.

5. Method according to claim 1, wherein the surfactant used is a mixture of non-ionic and anionic substances.

6. Method according to claim 1, wherein the comonomer component is introduced into the reaction chamber in two separate flows.

7. Method according to claim 1, wherein the comonomer component is introduced into the reaction chamber in two separate flows, in which with one of the said separate flows a major proportion of the comonomer component is introduced into the reaction chamber concurrently with the flow of the vinylidene chloride monomer component, the residual amount of the comonomer component to be introduced into the reaction chamber then being introduced with the other of the said separate flows.

8. An aqueous polyvinylidene copolymer emulsion whenever obtained by the method claimed in claim 1.

References Cited by the Examiner
UNITED STATES PATENTS

| | | | |
|---|---|---|---|
| 2,663,701 | 12/1953 | Ronay et al. | 260—80 |
| 2,713,568 | 7/1955 | Fisher et al. | 260—884 |
| 2,849,419 | 8/1958 | Hayes et al. | 260—884 |

MURRAY TILLMAN, *Primary Examiner.*

J. L. WHITE, *Assistant Examiner.*